(12) United States Patent
Shoshani et al.

(10) Patent No.: US 8,663,385 B2
(45) Date of Patent: Mar. 4, 2014

(54) MONTAN WAX SUBSTITUTE FOR GYPSUM PRODUCTS

(75) Inventors: Amnon Shoshani, Givat Ada (IL); Iris Glazer, Kiryat Shmona (IL); Daphna Halevy, Tel Aviv (IL); Shai Yosifon, Kiryat Tivon (IL)

(73) Assignee: T.I.P. Ltd., Caesarea Industrial Park (IL)

( * ) Notice: Subject to any disclaimer, the term of this patent is extended or adjusted under 35 U.S.C. 154(b) by 0 days.

(21) Appl. No.: 13/641,171

(22) PCT Filed: Apr. 13, 2011

(86) PCT No.: PCT/US2011/032199
§ 371 (c)(1),
(2), (4) Date: Jan. 2, 2013

(87) PCT Pub. No.: WO2011/130337
PCT Pub. Date: Oct. 20, 2011

(65) Prior Publication Data
US 2013/0199413 A1     Aug. 8, 2013

Related U.S. Application Data

(60) Provisional application No. 61/323,392, filed on Apr. 13, 2010.

(51) Int. Cl.
*C04B 24/26* (2006.01)
*C08L 91/06* (2006.01)
*C08L 91/08* (2006.01)

(52) U.S. Cl.
USPC ............................. 106/778; 106/271; 106/272

(58) Field of Classification Search
USPC .................................. 106/270, 271, 272, 778
See application file for complete search history.

(56) References Cited

U.S. PATENT DOCUMENTS

| | | | | |
|---|---|---|---|---|
| 5,049,186 A | * | 9/1991 | Kawabata | 106/2 |
| 6,890,976 B2 | * | 5/2005 | Sinnige | 524/5 |
| 7,071,249 B2 | * | 7/2006 | Ho et al. | 524/39 |
| 2011/0257301 A1 | * | 10/2011 | Stuart et al. | 524/5 |

FOREIGN PATENT DOCUMENTS

| | | |
|---|---|---|
| DE | 102005035515 | 2/2007 |
| EP | 0384322 | 8/1990 |
| EP | 0669377 | 8/1995 |
| WO | 02/098816 | 12/2002 |
| WO | 2004/033388 | 4/2004 |
| WO | WO 2008144905 A1 * | 12/2008 |
| WO | 2010/053494 | 5/2010 |

* cited by examiner

*Primary Examiner* — Anthony J Green
(74) *Attorney, Agent, or Firm* — Dekel Patent Ltd; David Klein

(57) ABSTRACT

A method of manufacturing a water-resistant gypsum product including forming an aqueous mixture of gypsum, water and a wax mixture, wherein the wax mixture includes a hydrocarbon wax, and a substitute material selected from the group consisting of (a) an asphaltite, (b) a polyolefin homopolymer, (c) a polyolefin copolymer, and (d) combinations thereof; and forming the mixture into a structure, and drying the structure while permitting hydration of the gypsum to form a gypsum product.

11 Claims, No Drawings

MONTAN WAX SUBSTITUTE FOR GYPSUM PRODUCTS

CROSS-REFERENCE TO RELATED APPLICATIONS

This application is a national phase patent application of, and claims priority from, PCT Patent Application PCT/US11/32199, filed Apr. 13, 2011, and claims priority under 35 USC §119 to U.S. Provisional Patent Application 61/323,392, filed Apr. 13, 2010.

FIELD OF THE INVENTION

The present invention relates generally to water repellants, such as wax or wax-like substances that are used to impart water repellency and other characteristics to gypsum products, such as gypsum wallboards or panels, and particularly to substitutes for montan wax to impart such characteristics.

BACKGROUND OF THE INVENTION

The production of gypsum based materials normally requires a slurry of calcium sulfate hemihydrate with water. The mixture is allowed to hydrate, or set to the harder calcium sulfate dihydrate, and the excess water is removed by drying through conventional methods. Gypsum products such as wall board panels are usually produced from a hardened gypsum core sandwiched between liners (e.g., paper liners), with the liners forming the outer surfaces of the board. To overcome problems of water absorption by the hygroscopic gypsum, which may lead to weakening of the wall board, it is known to add hydrophobic components into the gypsum slurry prior to making the wallboards. Such hydrophobic components include wax or silicone emulsions and others.

It has been found that emulsions of a blend of waxes are superior to single waxes in achieving satisfactory water repellency and other qualities. For example, a widely used blend is that of paraffin wax with montan wax.

Montan wax is a hard, fossil-plant wax extracted from certain types of lignite or brown coal. However, there is a major problem with montan wax. It is commercially available in only a few locations, including Amsdorf, Germany (the majority of montan wax coming from there), and in the Ione Basin near Ione in Amador County, Calif. Its rarity casts a shadow of doubt on its continued availability and makes it very expensive.

Attempts have been made to use substitutes for montan wax. For example, U.S. Pat. No. 6,890,976 describes a wax emulsion with a composition made of hydrocarbon wax (e.g., paraffin wax, carnauba wax, polyethylene wax, or maleated hydrocarbon waxes), a polyolefin-maleic anhydride graft polymer, and polyvinyl alcohol (PVA).

SUMMARY OF THE INVENTION

The present invention seeks to provide substitutes for montan wax to impart water repellency and other characteristics to gypsum products, such as gypsum wallboards or panels, as is described in detail further hereinbelow. The characteristics that can be imparted by the montan wax substitutes of the present invention include, without limitation, water repellence or resistance, water absorption control, sizing control, dimensional stability, thickness swell control, edge sealing, density control, mechanical strength control, stickiness control, preservation, mold prevention and any combination thereof.

There is thus provided in accordance with an embodiment of the present invention an aqueous wax mixture including a hydrocarbon wax, and a substitute material selected from the group consisting of (a) an asphaltite, (b) a polyolefin homopolymer, (c) a polyolefin copolymer, and (d) combinations thereof.

In accordance with an embodiment of the present invention the asphaltite is selected from the group consisting of uintaite, gilsonite, grahamite, and glance pitch. The polyolefin homopolymer may be selected from the group consisting of polyethylene homopolymers and oxidized polyethylene homopolymers. The polyolefin copolymer may be selected from the group consisting of ethylene acrylic acid copolymers, ethylene vinyl acetate copolymers and oxidized ethylene vinyl acetate copolymers. The wax mixture may further include montan wax. The wax mixture may further include polyvinyl alcohol or cellulose derivatives such as hydroxyethyl cellulose, carboxymethyl cellulose or surfactants or emulsifiers or any combination thereof.

There is also provided in accordance with an embodiment of the present invention a method of manufacturing a water-resistant gypsum product including forming an aqueous mixture of gypsum, water and a wax mixture, wherein the wax mixture includes a hydrocarbon wax, and a substitute material selected from the group consisting of (a) an asphaltite, (b) a polyolefin homopolymer, (c) a polyolefin copolymer, and (d) combinations thereof, forming the mixture into a structure, and drying the structure while permitting hydration of the gypsum to form a gypsum product. A gypsum product may be made by this method.

DETAILED DESCRIPTION OF EMBODIMENTS

It has been surprisingly found that the substitute materials achieve equivalent or superior water repellency, and other qualities, than montan wax. It was also surprisingly found that blends of the substitute materials, or blends of substitute materials combined with montan wax, achieve equivalent or superior water repellency than montan wax alone, and/or significantly reduce the amount of montan wax used, thereby achieving significant cost savings and reducing dependency on montan wax supply. It was also surprisingly found that blends of the substitute materials enable the reduction of total solids content of the mixture in the gypsum slurry thereby achieving significant cost savings. The substitute materials can reduce or even eliminate the use of PVA or cellulose derivatives used for water repellency. The substitute materials can be used as any kind of mixture, such as but not limited to, emulsions or suspensions or molten blends. Emulsifiers, surfactants and/or dispersing agents, may be added to such emulsions, suspensions or blends as the case may be.

The present invention provides a wax composite for addition to a gypsum slurry, comprising a hydrocarbon wax, such as but not limited to, paraffin wax, carnauba wax, plant wax or maleated hydrocarbon waxes, and a montan wax substitute, such as any one or combination from the following groups:

1. Asphaltite, such as but not limited to, uintaite, gilsonite, grahamite, and glance pitch
2. Polyolefin homopolymers, such as but not limited to, polyethylene homopolymers or oxidized polyethylene homopolymers.
3. Polyolefin copolymers, such as but not limited to, ethylene acrylic acid copolymers, ethylene vinyl acetate copolymers or oxidized ethylene vinyl acetate copolymers.

As mentioned before, the montan wax substitute may be combined with montan wax and fed into the gypsum slurry to achieve water repellency and/or other characteristics. The term slurry means slurry, blend, mixture or any other term used in these industries to describe the mixture of the main raw material with additives and or additions.

EXAMPLES

The invention is further illustrated by examples and comparative tests described herein below wherein the terms "part" and "percent" mean part by weight and percent by weight.

Tests were conducted to compare the water resistance of set gypsum disks formed from aqueous slurries of calcined gypsum (calcium sulfate hemihydrate) and containing aqueous mixtures of paraffin wax, montan wax substitute and/or montan wax and water containing a minor quantity of dispersing agent. All aqueous mixtures contained the same water/materials ratio (61% water and 39% materials).

The aqueous mixtures were prepared by heating the mixture to the molten state, blending the materials together and then mixing them with the calcined gypsum slurry.

The gypsum disks were prepared by mixing together the aqueous mixtures with calcined gypsum and water in defined proportions (100 parts of calcined gypsum, 65 parts of water and 5 parts of an aqueous mixture). The slurries so formed were poured into a metal ring and allowed to set for a set time at ambient temperature to form a gypsum disk. The gypsum disks were then dried in an air-circulating oven at 80° C. for a set time of 2.5 hours, allowed to cool to ambient temperature and weighed, following which they were immersed in water at 20° C. for 2 hours and re-weighed. The percent water absorbed based on the original weight of the dry disks were calculated. The water repellency results were categorized into four categories of water absorption: less than 1%, between 1% and 2%, higher than 2%, and higher than 10% (the higher the number, the worse its ability to repel water.)

Reference:

A reference mixture of 5% Montan wax 30% paraffin wax, and 4% polyvinyl alcohol was prepared and introduced into gypsum slurry to produce gypsum disks. Its water absorption was found to be between 1% and 2%.

Another reference mixture of 35% paraffin wax, 4% polyvinyl alcohol without montan wax substitutes or montan wax was prepared and introduced in an identical process into gypsum slurry to produce gypsum disks. Its water absorption was found to be 35% (placing it in the category of higher than 10%).

Example 1

A mixture of 5% material of a group 1, 30% paraffin wax, and 4% polyvinyl alcohol was prepared and introduced into gypsum slurry in an identical process to produce gypsum disks. Its water absorption was found to be between 1% and 2%.

Example 2

A mixture of 3.5% material of group 2, 31.5% paraffin wax, 4% polyvinyl alcohol was prepared and introduced in an identical process into gypsum slurry to produce gypsum disks. Its water absorption was found to be between 1% and 2%.

Example 3

A mixture of 0.5% Montan wax (ten times less than the reference), 30.5% paraffin wax, 4% Material from group 2 and 4% polyvinyl alcohol was prepared and introduced in an identical process into gypsum slurry to produce gypsum disks. Its water absorption was found to be lower than 1%. Example 3 is an example of one of the synergetic effects of the invention—the blend of montan wax substitute and montan wax has superior performance to that of montan wax alone.

Example 4

A mixture of 1% material from group 1, 30% paraffin wax, 4% material from group 2 and 4% polyvinyl alcohol was prepared and introduced in an identical process into gypsum slurry to produce gypsum disks. Its water absorption was found to be lower than 1%. Example 4 is an example of one of the synergetic effects of the invention—the blend of montan wax substitutes has superior performance to that of montan wax alone.

Example 5

A mixture of 3.2% material from group 3, 31.8% paraffin wax, and 5% polyvinyl alcohol was prepared and introduced in an identical process into gypsum slurry to produce gypsum disks. Its water absorption was found to be lower than 1%. Example 5 is an example of one of the synergetic effects of the invention—the blend of montan wax substitutes has superior performance to that of montan wax alone.

Example 6

A mixture of 3% material from group 1, 2% Montan wax, 30% paraffin wax and 4% polyvinyl alcohol was prepared and introduced in an identical process into gypsum slurry to produce gypsum disks. Its water absorption was found to be between 1% and 2%.

Example 7

A mixture of 0.5% Montan wax (ten times less than the reference), 30.5% paraffin wax, 4% Material from group 3 and 4% polyvinyl alcohol was prepared and introduced in an identical process into gypsum slurry to produce gypsum disks. Its water absorption was found to be between 1% and 2%.

Example 8

A mixture of 1% material from group 1, 30% paraffin wax, 4% material from group 3 and 4% polyvinyl alcohol was prepared and introduced in an identical process into gypsum slurry to produce gypsum disks. Its water absorption was found to be between 1% and 2%.

Example 9

A mixture of 3% material from group 2, 2% material from group 3, 30% paraffin wax and 4% polyvinyl alcohol was prepared and introduced in an identical process into gypsum slurry to produce gypsum disks. Its water absorption was found to be between 1% and 2%.

Example 10

A mixture of 5% blend of substitute materials 24% paraffin wax and 4% polyvinyl alcohol was prepared and introduced in an identical process into gypsum slurry to produce gypsum disks. Its water absorption was found to be between 1% and 2%. Example 10 is an example of the ability of the substitutes to reduce the total wax content while maintaining equal or superior performance to that of montan wax alone (33% solid content compared to 39% of the reference).

Example 11

A mixture of 4% of another blend of substitute materials 24% paraffin wax and 4% polyvinyl alcohol was prepared and introduced in an identical process into gypsum slurry to produce gypsum disks. Its water absorption was found to be between 1% and 2%. Example 11 is an example of the ability of the substitutes to reduce the total wax content while maintaining equal or superior performance to that of montan wax alone (32% solid content compared to 39% of the reference).

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. An aqueous wax mixture comprising:
   gypsum;
   water;
   a hydrocarbon wax; and
   an asphaltite comprising at least one of uintaite, gilsonite, grahamite, and glance pitch.

2. The mixture according to claim 1, further comprising a polyolefin homopolymer.

3. The mixture according to claim 1, wherein said polyolefin homopolymer is selected from the group consisting of polyethylene homopolymers and oxidized polyethylene homopolymers.

4. The mixture according to claim 1, further comprising montan wax.

5. The mixture according to claim 1, further comprising polyvinyl alcohol.

6. The mixture according to claim 1, further comprising a polyolefin copolymer.

7. The mixture according to claim 6, wherein said polyolefin copolymer is selected from the group consisting of ethylene acrylic acid copolymers, ethylene vinyl acetate copolymers and oxidized ethylene vinyl acetate copolymers.

8. A method of manufacturing a water-resistant gypsum product comprising:
   forming an aqueous mixture of gypsum, water and a wax mixture, wherein said wax mixture comprises a hydrocarbon wax, and an asphaltite comprising at least one of uintaite, gilsonite, grahamite, and glance pitch; and
   forming the mixture into a structure; and
   drying the structure while permitting hydration of the gypsum to form a gypsum product.

9. The method according to claim 8, further comprising adding a polyolefin homopolymer to the aqueous mixture.

10. The method according to claim 8, further comprising adding a polyolefin copolymer to the aqueous mixture.

11. A gypsum product made by the method of claim 8.

* * * * *